United States Patent
Ninomiya

(10) Patent No.: US 10,967,684 B2
(45) Date of Patent: Apr. 6, 2021

(54) TIRE

(71) Applicant: Sumitomo Rubber Industries, Ltd., Kobe (JP)

(72) Inventor: Hiroaki Ninomiya, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 402 days.

(21) Appl. No.: 15/928,580

(22) Filed: Mar. 22, 2018

(65) Prior Publication Data
US 2018/0297416 A1    Oct. 18, 2018

(30) Foreign Application Priority Data

Apr. 18, 2017 (JP) ............................. JP2017-082231

(51) Int. Cl.
*B60C 11/12* (2006.01)
*B60C 11/13* (2006.01)
*B60C 11/03* (2006.01)

(52) U.S. Cl.
CPC ...... *B60C 11/1263* (2013.01); *B60C 11/0306* (2013.01); *B60C 11/12* (2013.01);
(Continued)

(58) Field of Classification Search
CPC . B60C 11/0306; B60C 11/12; B60C 11/1236; B60C 11/1281;
(Continued)

(56) References Cited

U.S. PATENT DOCUMENTS 4,815,512 A * 3/1989 Gerresheim ........ B60C 11/0306
152/209.18
2001/0022209 A1 * 9/2001 Chaen ..................... B60C 11/12
152/151
(Continued)

FOREIGN PATENT DOCUMENTS

DE           3329320 A1 * 2/1985
JP        62-268709 A * 11/1987
(Continued)

OTHER PUBLICATIONS

Machine translation for Japan 04-197806 (Year: 2020).*
(Continued)

*Primary Examiner* — Steven D Maki
(74) *Attorney, Agent, or Firm* — Birch, Stewart, Kolasch & Birch, LLP

(57) ABSTRACT

A tire includes a tread portion including a first land portion defined between circumferentially extending first and second edges. The first land portion is provided with first and second lateral grooves respectively extending from the first and second edges and terminating within the first land portion and a circumferentially extending first longitudinal narrow groove in communication with the first and second lateral grooves. Each of the first and second lateral grooves includes a wide-width portion and a narrow-width portion.

(Continued)

The wide-width portion of each of the first lateral grooves extends from the first edge and the wide-width portion of each of the second lateral grooves extends from the second edge. The first longitudinal narrow groove passes through the narrow-width portion of each of the first and second lateral grooves without passing through the wide-width portion of each of the first and second lateral grooves.

19 Claims, 10 Drawing Sheets

(52) U.S. Cl.
CPC ........ *B60C 11/1204* (2013.01); *B60C 11/125* (2013.01); *B60C 11/1236* (2013.01); *B60C 11/1281* (2013.01); *B60C 11/1369* (2013.01); *B60C 2011/036* (2013.01); *B60C 2011/0348* (2013.01); *B60C 2011/0351* (2013.01); *B60C 2011/0365* (2013.01); *B60C 2011/0367* (2013.01); *B60C 2011/0369* (2013.01); *B60C 2011/0381* (2013.01); *B60C 2011/0383* (2013.01); *B60C 2011/1209* (2013.01); *B60C 2011/1213* (2013.01); *B60C 2011/1227* (2013.01); *B60C 2011/1231* (2013.01); *B60C 2011/1245* (2013.01); *B60C 2011/1361* (2013.01)

(58) Field of Classification Search
CPC ..... B60C 2011/0348; B60C 2011/0351; B60C 2011/0381; B60C 2011/0383; B60C 2011/1213; B60C 2011/1245; B60C 2011/1231; B60C 11/1263; B60C 11/1369
See application file for complete search history.

(56) References Cited

U.S. PATENT DOCUMENTS

| 2003/0101851 A1* | 6/2003 | Domange | B29D 30/0606 |
| | | | 76/101.1 |
| 2012/0103492 A1* | 5/2012 | Knispel | B60C 11/1263 |
| | | | 152/209.21 |
| 2013/0167996 A1* | 7/2013 | Oda | B60C 11/04 |
| | | | 152/209.18 |
| 2016/0089938 A1* | 3/2016 | Iwasaki | B60C 11/1236 |
| | | | 152/209.18 |

FOREIGN PATENT DOCUMENTS

| JP | 62-275806 A | * | 11/1987 |
| JP | 03-014704 A | * | 1/1991 |
| JP | 04-197806 A | * | 7/1992 |
| JP | 2014-180951 A | * | 9/2014 |
| JP | 2015-221650 A | | 12/2015 |
| WO | WO-2015/113992 A1 | * | 8/2015 |

OTHER PUBLICATIONS

Machine translation for Japan 62-275806 (Year: 2020).*
Machine translation for Japan 62-268709 (Year: 2020).*
Machine translation for German 3329320 (Year: 2020).*
Machine translation for Japan 2014-180951 (Year: 2020).*
Translation for Japan 03-014704 (Year: 2020).*

* cited by examiner

TIRE

BACKGROUND ART

Field of the Invention

The present disclosure relates to tires, and more particularly to a tire capable of exerting better driving performance on snow and ice road conditions while maintaining steering stability on dry road condition.

Description of the Related Art

For example, Japanese Unexamined Patent Application Publication discloses a winter tire which includes a tread portion having a land portion provided with a plurality of lateral grooves and a longitudinal groove that is in communication with the plurality of lateral grooves.

Unfortunately, the tire tends to exhibit low steering stability on dry road condition since the land portion, especially junctions of each lateral groove and the longitudinal groove deforms easily.

SUMMARY OF THE INVENTION

The present disclosure has been made in view of the above circumstances and has an object to provide a tire capable of exerting better driving performance on snow and ice road conditions while maintaining steering stability on dry road condition.

According to one aspect of the disclosure, a tire includes a tread portion including a first land portion having a ground contact surface defined between a circumferentially extending first edge and a circumferentially extending second edge. The first land portion is provided with first lateral grooves extending from the first edge toward the second edge and terminating within the first land portion, second lateral grooves extending from the second edge toward the first edge and terminating within the first land portion and a circumferentially extending first longitudinal narrow groove in communication with the first lateral grooves and the second lateral grooves. Each of the first lateral grooves and the second lateral grooves includes a wide-width portion and a narrow-width portion having a width smaller than that of the wide-width portion. The wide-width portion of each of the first lateral grooves extends from the first edge and the wide-width portion of each of the second lateral grooves extends from the second edge. The first longitudinal narrow groove passes through the narrow-width portion of each of the first lateral grooves and the second lateral grooves without passing through the wide-width portion of each of the first lateral grooves and the second lateral grooves.

In another aspect of the disclosure, the first land portion may be located on a tire equator.

In another aspect of the disclosure, the first longitudinal narrow groove may pass through the narrow-width portion of each of the first lateral grooves and the second lateral grooves in a cross-shaped manner.

In another aspect of the disclosure, in each of the first lateral grooves and the second lateral grooves, the narrow-width portion may be longer in length in a tire axial direction than the wide-width portion.

In another aspect of the disclosure, in each of the first lateral grooves and the second lateral grooves, the narrow-width portion may have a maximum depth equal to or less than a maximum depth of the wide-width portion.

In another aspect of the disclosure, in each of the first lateral grooves and the second lateral grooves, the narrow-width portion may have a maximum depth less than a maximum depth of the wide-width portion.

In another aspect of the disclosure, in each of the first lateral grooves and the second lateral grooves, the narrow-width portion may have a maximum depth greater than a maximum depth of the first longitudinal narrow groove.

In another aspect of the disclosure, the tread portion may further include a second land portion having a ground contact surface defined between a circumferentially extending third edge and a circumferentially extending fourth edge.

The second land portion may include blocks divided by transverse grooves traversing completely the second land portion, and each of the blocks may be provided with a third lateral groove extending from the third edge toward the fourth edge and terminating within the block and a fourth lateral groove extending from the fourth edge toward the third edge and terminating within the block.

In another aspect of the disclosure, the blocks may include first blocks and second blocks, each of the first blocks may be provided with the third lateral groove and the fourth lateral groove each of which extends in a constant width, each of the second blocks may be provided with the third lateral groove and the fourth lateral groove each of which includes a wide-width portion and a narrow-width portion having a width smaller than that of the wide-width portion.

In another aspect of the disclosure, the first blocks and the second blocks may be arranged alternately in a tire circumferential direction.

In another aspect of the disclosure, each of the blocks may be provided with a circumferentially extending second longitudinal narrow groove in communication with the third lateral groove and the fourth lateral groove.

In another aspect of the disclosure, the second longitudinal narrow groove may have both ends terminating within the block.

In another aspect of the disclosure, the tread portion is provided with a plurality of circumferentially and continuously extending main grooves to divide the tread portion into a plurality of land portions.

The plurality of main grooves may consist of four axially spaced main grooves.

The plurality of land portions may consist of five land portions including said first land portion.

In another aspect of the disclosure, the plurality of land portions may consist of five land portions including said first land portion and said second land portion arranged adjacently to said first land portion.

DESCRIPTION OF THE PREFERRED EMBODIMENTS

An embodiment of the present disclosure will be explained below with reference to the accompanying drawings.

Figure 1:
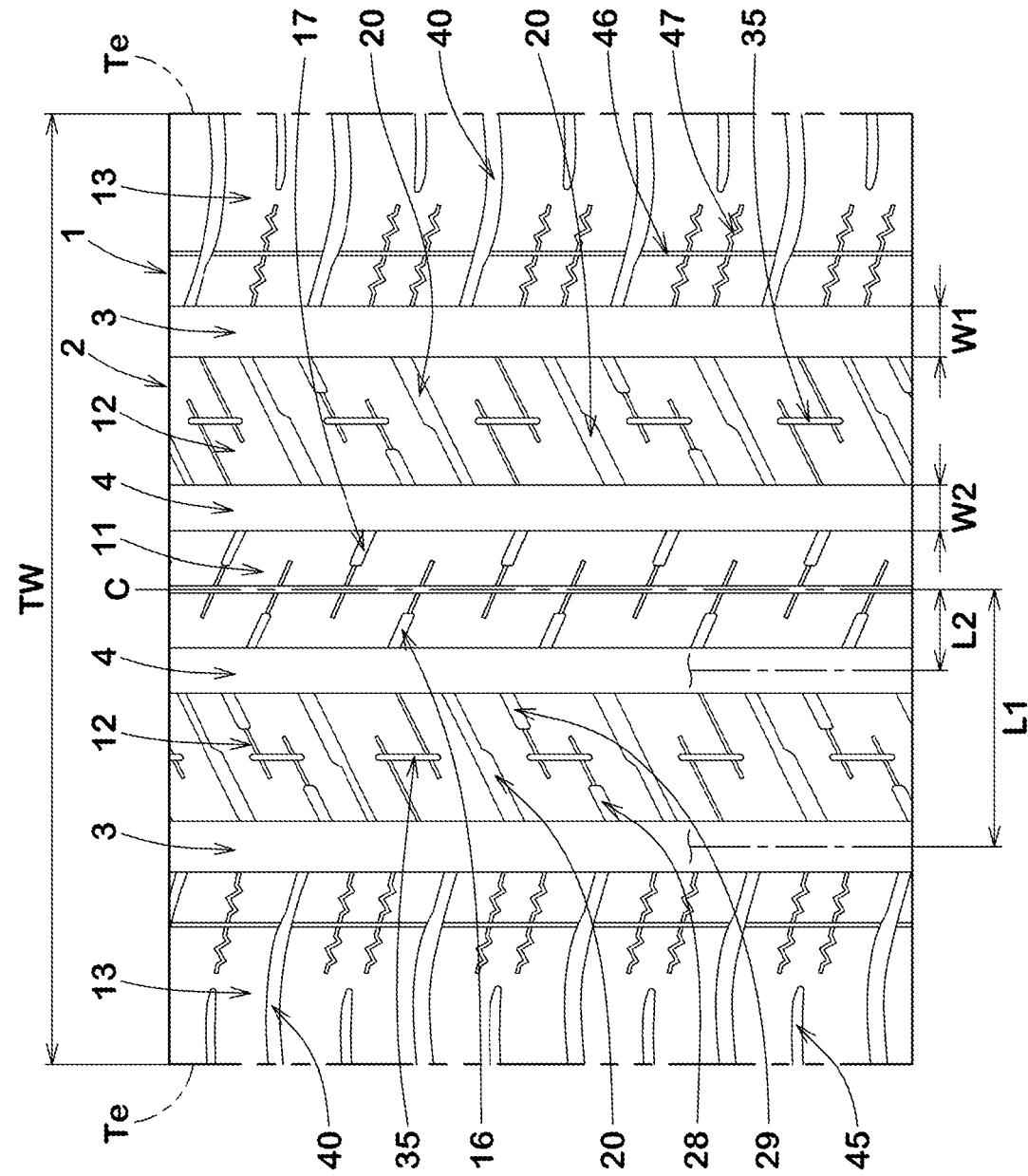
FIG. 1 illustrates a development view of a tread portion of a tire in accordance with one embodiment of the present disclosure.

FIG. 1 illustrates a development view of a tread portion 2 of a tire 1 in accordance with one embodiment of the present disclosure. The tire 1 in accordance with the present disclosure, for example, is preferably embodied as a passenger car tire for winter. In another aspect of the disclosure, the tire 1, for example, may be embodied as a heavy-duty tire or a non-pneumatic tire which can support the tire load structurally without being filled with a pressurized air.

As illustrated in FIG. 1, the tread portion 2, for example, is provided with a pair of circumferentially and continuously extending shoulder main grooves 3 and at least one circumferentially and continuously extending crown main groove 4.

The shoulder main grooves 3, for example, are arranged such that one is between one tread edge Te and the other one is between the tire equator C and the other one tread edge Te.

As used herein, the tread edges Te are the axial outermost edges of the ground contacting patch of the tread portion 2 which occurs under a condition where the tire being under a standard condition is grounded on a plane with a standard tire load at the camber angle of zero degrees. As used herein, the standard condition is such that the tire is mounted on a standard wheel rim and inflated to a standard pressure but loaded with no tire load. In this application including specification and claims, various dimensions, positions and the like of the tire refer to those under the standard condition of the tire unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved for the tire by standards organizations, wherein the standard tire load is the "maximum load capacity" in JATMA, the "Load Capacity" in ETRTO, and the maximum value given in the above-mentioned table in TRA or the like.

The at least one crown main groove 4, for example, is arranged inwardly of the shoulder main grooves 3 in the tire axial direction. In this embodiment, the at least one crown main groove 4, for example, comprises a pair of axially spaced crown main grooves 4 such that the tire equator C is located therebetween. Alternatively, the at least one crown main groove 4, for example, may consist of one located on or near the tire equator C.

Each of the shoulder main grooves 3 and the crown main grooves 4, for example, extends in a straight manner in the tire circumferential direction. Each of the main grooves 3 and 4 is not limited to such an aspect, but can extend in a zigzag or wavy manner in the tire circumferential direction.

Preferably, each of the shoulder main grooves 3, for example, is arranged on a location such that the groove centerline is away at a distance L1 from the tire equator C in a range of from 0.20 to 0.30 times the tread width TW in order to exert better driving performance on snow and ice road conditions and steering stability on dry road condition in a well-balanced manner. Preferably, each of the crown main grooves 4, for example, is arranged on a location such that the groove centerline is away at a distance L2 from the tire equator C in a range of from 0.05 to 0.12 times the tread width TW. Note that the tread width TW is defined as a distance in the tire axial direction between the tread edges Te under the standard condition.

Preferably, the shoulder main grooves 3, for example, have groove widths W1 in a range of from 4.0% to 7.5% of the tread width TW. Preferably, the crown main grooves 4, for example, have groove widths W2 in a range of from 2.5% to 6.0% of the tread width TW. Preferably, the shoulder main grooves 3 and the crown main grooves 4 have depths 5 to 10 mm upon a passenger car tire, for example.

The tread portion 2, for example, is divided into five land portions by the above four main grooves. The land portions include a first land portion 11. In some preferred embodiments, the first land portion 11 is located on the tire equator C between the pair of crown main grooves 4. Note that the first land portion 11 is not limited to such an aspect, but can be defined between the adjacent shoulder main groove 3 and crown main groove 4, or between the adjacent shoulder main groove 3 and tread edge Te, for example.

Figure 2:
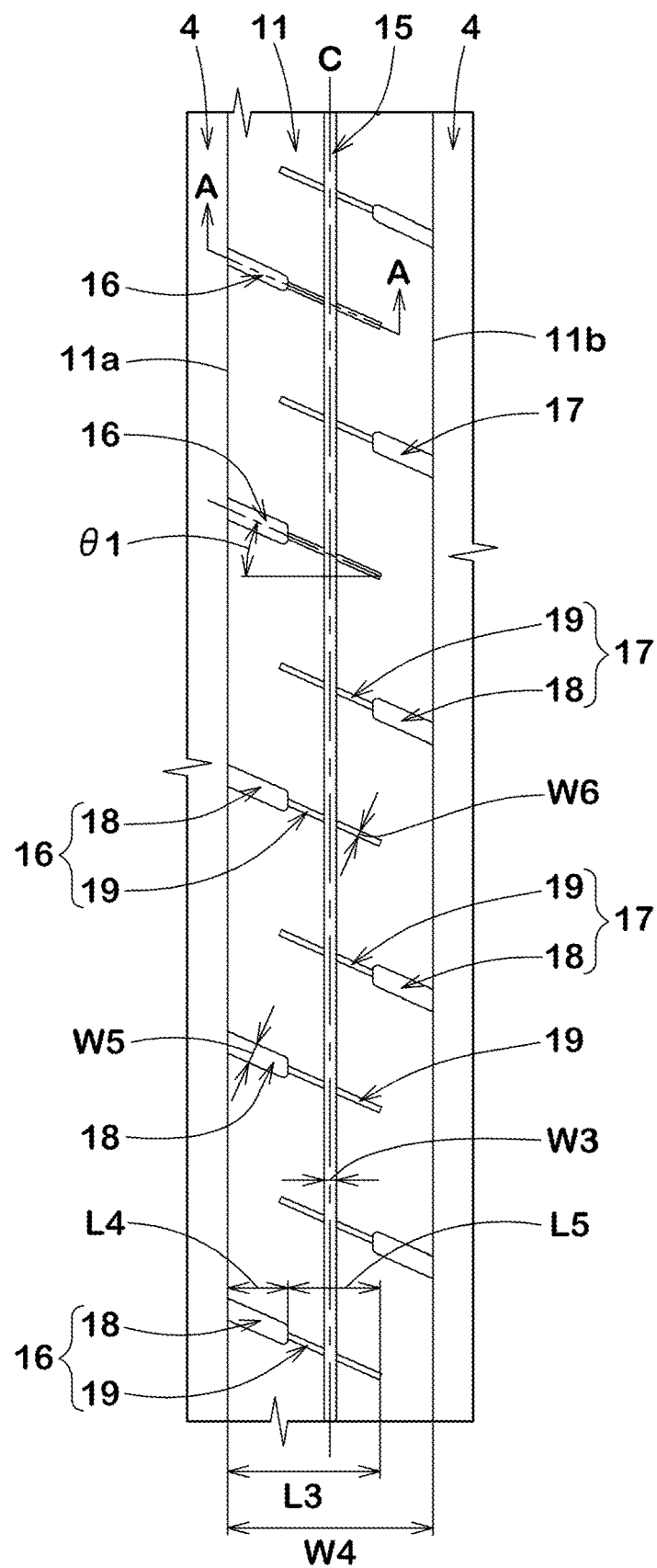
FIG. 2 is a partial enlarged view of a first land portion of FIG. 1.

FIG. 2 illustrates a partial enlarged view of the first land portion 11. As illustrated in FIG. 2, the first land portion 11 has a ground contact surface defined between a circumferentially extending first edge 11a and a circumferentially extending second edge 11b. The first land portion is provided with a plurality of first lateral grooves 16, a plurality of second lateral grooves 17 and a first longitudinal narrow groove 15.

The first lateral grooves 16 each extend from the first edge 11a toward the second edge 11b, and terminate within the first land portion 11. The second lateral grooves 17 each extend from the second edge 11b toward the first edge 11a, and terminate within the first land portion 11. The first longitudinal narrow groove 15 extends in the tire circumferential direction to communicate with the first lateral grooves 16 and the second lateral grooves 17.

These edges of the first lateral grooves 16, second lateral grooves 17 and first longitudinal narrow groove 15 may scratch the ground to generate large friction force upon running on ice and snow road conditions. Further, since the first lateral grooves 16 and the second lateral grooves 17 terminate within the first land portion 11, reduction in rigidity of the first land portion 11 may be suppressed to ensure steering stability on dry road condition.

Each of the first lateral grooves 16 and the second lateral grooves 17 includes a wide-width portion 18 and the narrow-width portion 19 having a width smaller than that of the wide-width portion 18. The wide-width portion 18 of each of the first lateral grooves 16 extends from the first edge 11a and the wide-width portion 18 of each of the second lateral grooves 17 extends from the second edge 11b. The first longitudinal narrow groove 15 passes through the narrow-width portion 19 of each of the first lateral grooves 16 and the second lateral grooves 17 without passing through the wide-width portion 18 of each of the first lateral grooves 16 and the second lateral grooves 17.

In the tire 1 in accordance with the present disclosure, since each narrow-width portion 19 having a relative small width is connected to the first longitudinal narrow groove 15, rigidity of the first land portion 11 can be maintained to suppress large deformation at junctions where the respective lateral grooves and the first longitudinal narrow groove are connected upon running on dry road condition. On the other hand, the junctions of each narrow-width portion 19 and the first longitudinal narrow groove 15 may open properly upon receiving a ground contact pressure on ice and snow road conditions, thereby offering large friction force due to these edges.

In some preferred embodiments, the first longitudinal narrow groove 15, for example, is located at a center of the first land portion 11 in the tire axial direction. In some preferred embodiments, the first longitudinal narrow groove 15, for example, extends along the tire circumferential direction in a straight manner. In some preferred embodiments, the first longitudinal narrow groove 15 is located on the tire equator C on which a large ground contact pressure acts, thereby helping in generating large friction force. Alternatively, the first longitudinal narrow groove 15, for example, may extend in the tire circumferential direction while oscillating in the tire axial direction.

Preferably, the width W3 of first longitudinal narrow groove 15, for example, is in a range of from 0.5 to 3.0 mm, more preferably in a range of from 1.5 to 2.5 mm. The first longitudinal narrow groove 15 as such may exert better noise performance due to reduction in air pumping noise to be generated upon grounding in addition to the above effects.

In some preferred embodiment, the first lateral grooves 16 and the second lateral grooves 17 are arranged alternately in the tire circumferential direction. Preferably, the first lateral grooves 16 and the second lateral grooves 17, for example, are inclined in the same direction with respect to the tire axial direction. Preferably, the first lateral grooves 16 and the second lateral grooves 17, for example, are inclined at angles θ1 in a range of from 15 to 30 degrees with respect to the tire axial direction in order to generate friction force in the tire circumferential and axial directions in well-balanced manner. Preferably, the first lateral grooves 16 and the second lateral grooves 17, for example, extend in a straight manner so as to be inclined at a constant angle with respect to the tire axial direction.

Preferably, the first lateral grooves 16 and/or the second lateral grooves 17 may have lengths L3 in the tire axial direction in a range of from 0.65 to 0.85 times, more preferably 0.70 to 0.80 times the width W4 in the tire axial direction of first land portion 11 in order to improve steering stability on dry road condition and driving performance on ice and snow road conditions in well-balanced manner.

In the same point of view, a width W5 of each wide-width portion 18 may preferably be in a range of from 0.20 to 0.30 times the widths W2 (shown in FIG. 1) of the crown main grooves 4. Preferably, lengths L4 in the tire axial direction of the wide-width portions 18 of the first lateral grooves 16 and the second lateral grooves 17 are in a range of from 0.20 to 0.55 times, more preferably in a range of from 0.30 to 0.45 times the lengths L3 of the first lateral grooves 16 and the second lateral grooves 17, respectively.

Preferably, the first longitudinal narrow groove 15 passes through each of the narrow-width portion 19 of each of the first lateral grooves 16 and the second lateral grooves 17 in a cross-shaped manner as shown in FIG. 2. Alternatively, the first longitudinal narrow groove 15 may pass through each of the narrow-width portions 19 in a T-shaped manner. For example, the first longitudinal narrow groove 15 may extend to communicate with terminal ends of each the narrow-width portions 19.

In each of the first lateral grooves 16 and the second lateral grooves 17, the narrow-width portion 19 preferably has a groove width W6 in a range of from 0.30 to 0.50 times the groove width W5 of the wide-width portion 18, for example. In some preferred embodiments, the groove width W6 of narrow-width portion 19, for example, is less than 1.5 mm in order to improve steering stability on dry road condition and noise performance. Note that a groove or cut having a width of less than 1.5 mm may be referred to as a "sipe" in this specification.

In each of the first lateral grooves 16 and the second lateral grooves 17, the narrow-width portion 19 preferably have a length L5 in the tire axial direction longer than that of the wide-width portion 18, for example. Specifically, the length L5 of the narrow-width portion 19 is preferably in a range of from 1.50 to 1.70 times the length L4 of the wide-width portion 18 in order to exhibit better driving performance on ice and snow road conditions while maintaining rigidity of the first land portion 11.

Figure 3:
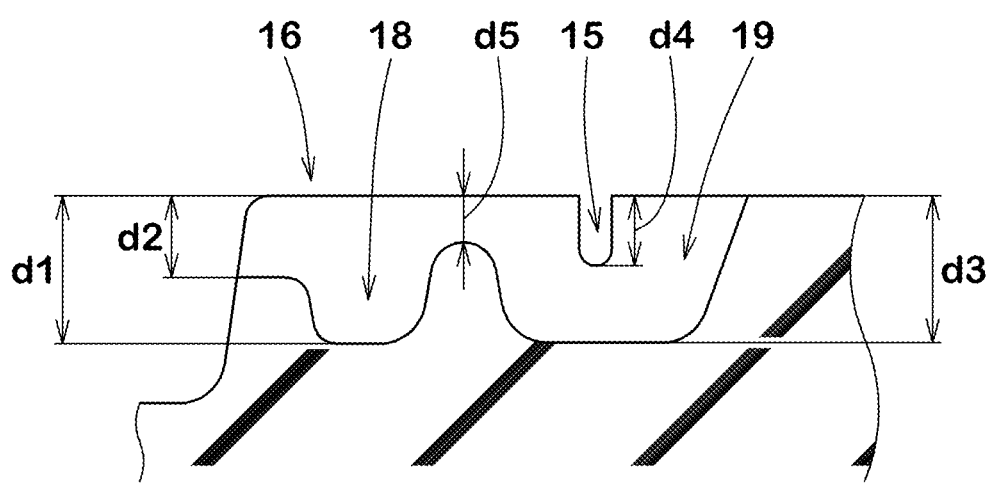
FIG. 3 is a cross-sectional view taken along line A-A of FIG. 2.

FIG. 3 illustrates a cross-sectional view of one of the first lateral grooves 16 taken along line A-A of FIG. 2. As illustrated in FIG. 3, the wide-width portion 18, for example, has a maximum depth d1 which is smaller than that of the main grooves.

In some preferred embodiments, the wide-width portion 18 has a raised bottom upwardly on an end portion which locates on the side of the main groove to which the wide-width portion 18 is connected. The depth d2 at the end portion of the wide-width portion 18 on the side of the main groove is preferably in a range of from 0.50 to 0.65 times the maximum depth d1 of the wide-width portion 18, for example. Thus, excessive deformation of the first land portion 11 may be suppressed, resulting in improved steering stability on dry road condition.

The narrow-width portion 19 may have a maximum depth d3 equal to or less than the maximum depth d1 of the wide-width portion 18, for example. In this embodiment, the maximum depth d3 of the narrow-width portion 19 is equal to the maximum depth d1 of the wide-width portion 18. Alternatively, the maximum depth d3 of the narrow-width portion 19 may be less than the maximum depth d1 of the wide-width portion 18.

Preferably, the maximum depth d3 of the narrow-width portion 19, for example, is greater than a maximum depth d4 of the first longitudinal narrow groove 15. The narrow-width portion 19 as such may open properly upon receiving a ground contact pressure, thereby offering large friction force due to these edges.

In order to maintain steering stability on dry road condition, the narrow-width portion 19, for example, may have a raised bottom upwardly on an end portion on the side of the wide-width portion 18. Preferably, a depth d5 of the end, for example, is in a range of from 0.25 to 0.35 times the maximum depth d3 of the narrow-width portion 19. In some preferred embodiments, the depth d5 of the end of the narrow-width portion 19 may be smaller than the depth d2 of the end of the wide-width portion 18.

As illustrated in FIG. 1, the tread portion 2 also includes a pair of second land portions 12 and a pair of third land portions 13. The second land portions 12 each are defined between the shoulder main groove 3 and the crown main groove 4 on each side of the tire equator C. The third land portions 13 each are defined outwardly of the shoulder main groove 3 in the tire axial direction on each side of the tire equator C. Note that the second land portions 12 and the third land portions 13 are not limited to the above locations.

Figure 4:
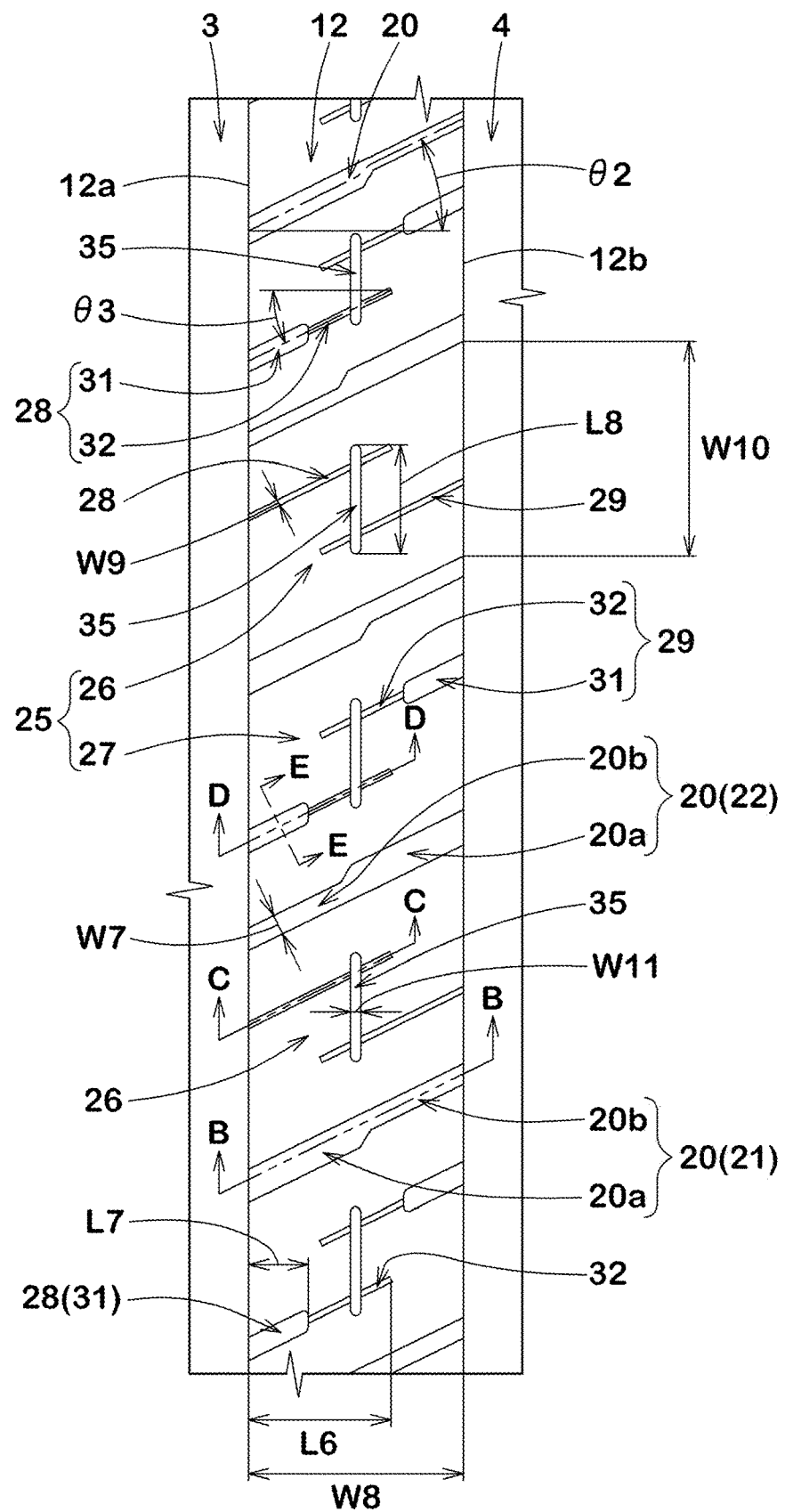
FIG. 4 is a partial enlarged view of a second land portion of FIG. 1.

FIG. 4 illustrates a partial enlarged view of one of the second land portions 12. As illustrated in FIG. 4, each second land portion 12, for example, includes a ground contact surface defined between a circumferentially extending third edge 12a and a circumferentially extending fourth edge 12b. The second land portion 12, for example, includes blocks 25 divided by transverse grooves 20 traversing completely the second land portion 12.

Preferably, the transverse grooves 20, for example, are inclined with respect to the tire axial direction in an opposite direction to the first lateral grooves 16 and the second lateral grooves 17. In this embodiment, the transverse grooves 20, for example, are inclined at angles θ2 of from 20 to 30 degrees with respect to the tire axial direction.

Preferably, the transverse grooves 20 have groove widths W7 in a range of from 0.20 to 0.60 times the widths W1 (shown in FIG. 1) of the shoulder main grooves 3, for example. Preferably, each of the transverse grooves 20, for example, includes a first portion 20a and a second portion 20b having a width smaller than that of the first portion 20a. In this embodiment, the transverse grooves 20, for example, include first transverse grooves 21 and second transverse grooves 22 which have different specification and are arranged alternately in the tire circumferential direction. The first transverse grooves 21, for example, each include the first portion 20a in communication with the shoulder main groove 3 and the second portion 20b in communication with the crown main groove 4. The second transverse grooves 22, for example, each include the first portion 20a in communication with the crown main groove 4 and the second portion 20b in communication with the shoulder main groove 3. These transverse grooves 20 having such a groove arrangement may be useful to improve steering stability on dry road condition by being deformed the second land portion uniformly.

Figure 5:
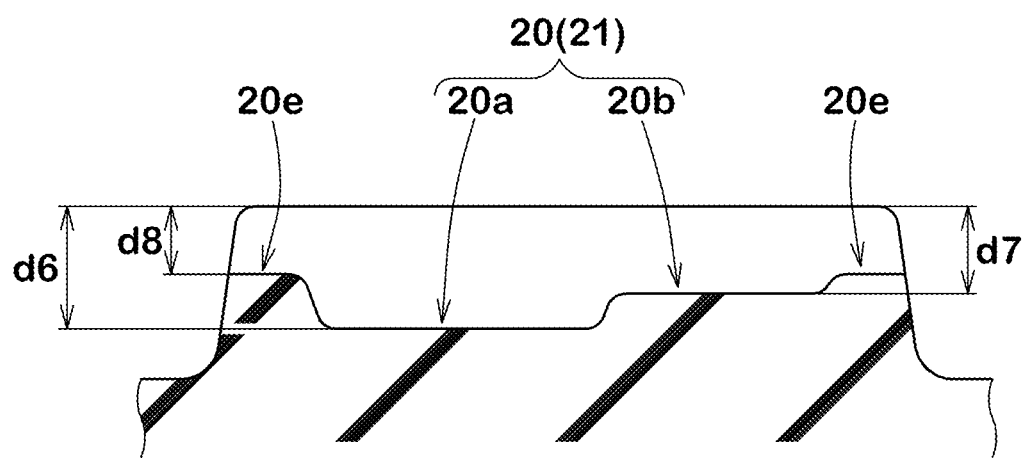
FIG. 5 is a cross-sectional view taken along line B-B of FIG. 4.

FIG. 5 illustrates a cross-sectional view of one of transverse grooves 20 taken along line B-B of FIG. 4. As illustrated in FIG. 5, a maximum depth d7 of the second portion 20b is preferably smaller than a maximum depth d6 of the first portion 20a. The depth d7 of second portion 20b, for example, is preferably in a range of from 0.65 to 0.75 times the depth d6 of first portion 20a.

In this embodiment, each transverse groove 20 has a raised bottom upwardly on its both end portions 20e. Preferably, each depth d8 of the end portions 20e, for example, is in a range of from 0.50 to 0.60 times the maximum depth d6 of the first portion 20a. These transverse grooves 20 may improve steering stability on dry road condition by suppressing reduction in rigidity of the land portion. Further, these transverse grooves 20 may reduce air pumping noise to exert better noise performance.

As illustrated in FIG. 4, each of the blocks 25 is provided with a third lateral groove 28 and a fourth lateral groove 29. The third lateral groove 28 extends from the third edge 12a toward the fourth edge 12b, and terminates within the block 25. The fourth lateral groove 29 extends from the fourth edge 12b toward the third edge 12a, and terminates within the block 25.

Preferably, each of the lateral grooves 28 and 29, for example, is inclined in the same direction as the transverse grooves 20 with respect to the tire axial direction. Preferably, each of the lateral grooves 28 and 29, for example, is inclined at an angle θ3 of from 20 to 30 degrees with respect to the tire axial direction.

Preferably, axial lengths L6 of the third lateral grooves 28 and fourth lateral grooves 29 in the tire axial direction, for example, are in a range of from 0.20 to 0.80 times the width W8 of the second land portion 12 in the tire axial direction.

The blocks 25, for example, include first blocks 26 and second blocks 27 having different configuration of lateral grooves 28 and 29 from each other. The first blocks 26 each are provided with the third lateral groove 28 and the fourth lateral groove 29 each having a constant width W9. Preferably, the width W9, for example, is less than 1.5 mm, i.e., the third lateral groove 28 and the fourth lateral groove 29 on each first block 26 may be configured as sipes. Thus, the first blocks 25 may have high rigidity, thereby ensuring steering stability on dry road condition.

The second blocks 27 each are provided with the third lateral groove 28 and the fourth lateral groove 29 each of which includes a wide-width portion 31 and a narrow-width portion 32 having a width smaller than that of the wide-width portion 31. The wide-width portion 31 and the narrow-width portion 32 are preferably configured as the same widths of the wide-width portion 18 and the narrow-width portion 19, respectively of the first lateral grooves 16 and the second lateral grooves 17.

Preferably, in each of the third lateral grooves 28 and the fourth lateral grooves 29, a length L7 of wide-width portion 31 in the tire axial direction, for example, is in a range of from 0.20 to 0.60 times, more preferably 0.40 to 0.55 times the total length L6 of the concerned third lateral groove 28 or fourth lateral groove 29. Thus, steering stability on dry road condition and driving performance on ice and snow can be improved in well-balanced manner.

The first blocks 26 and second blocks 27 tend to generate impact sound in different frequency band upon grounding, resulting in generating white noise. In some preferred embodiments, the first blocks 26 and the second blocks 27 are arranged alternately in the tire circumferential direction. Note that the arrangement of the first blocks 26 and second blocks 27 is not limited to the above aspect.

Figure 6A:
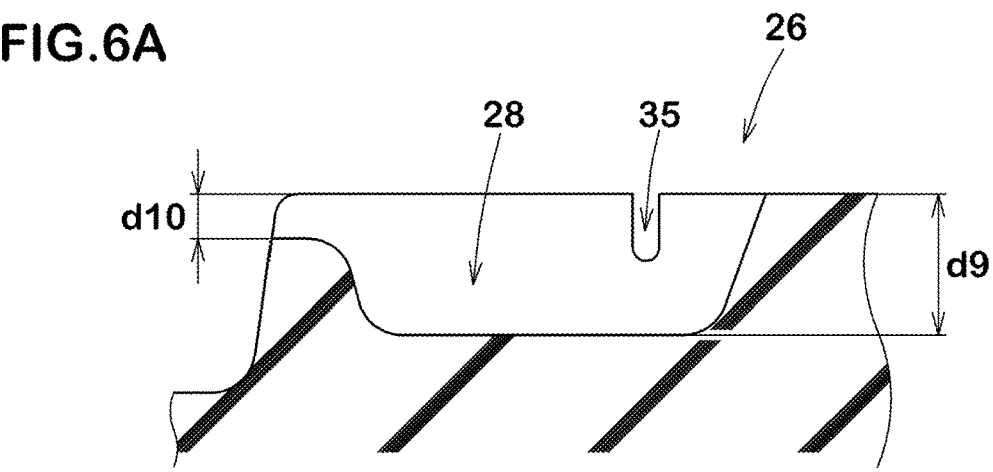
FIG. 6A, FIG. 6B and FIG. 6C are cross-sectional views taken along lines C-C, D-D and E-E of FIG. 4, respectively.

FIG. 6A illustrates a cross-sectional view of one of the third lateral grooves 28 provided on one of the first blocks 26, and which is taken along line C-C of FIG. 4. As illustrated in FIG. 6A, each third lateral groove 28 provided on the respective first blocks 26, for example, preferably has a raised bottom portion upwardly at an end portion connected to the main groove. Preferably, the depth d10 of the end portion, for example, is in a range of from 0.25 to 0.35 times the maximum depth d9 of the third lateral groove 28. Note that the same configuration of the third lateral groove 28 as described above may also be applied to each fourth lateral groove 29 provided on the respective first blocks 26.

Figure 6B:
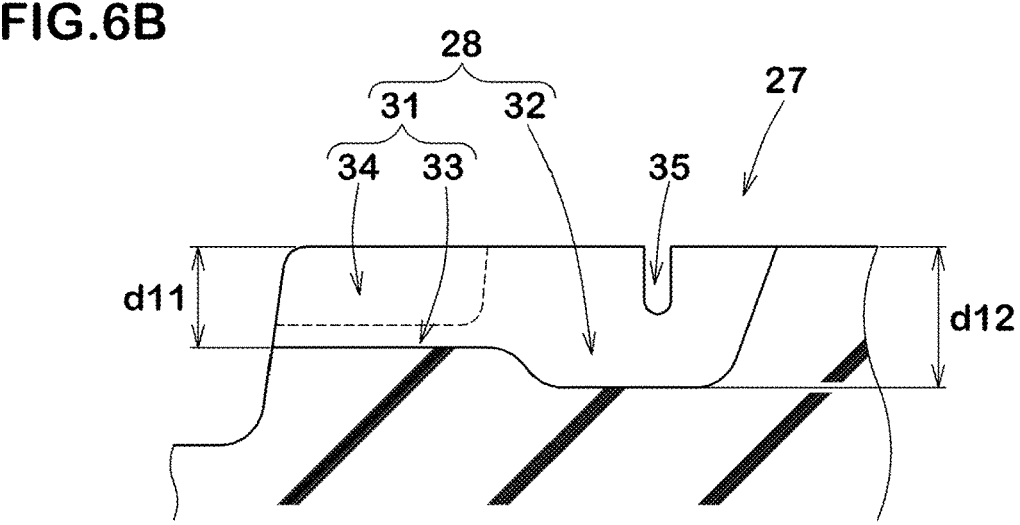

FIG. 6B illustrates a cross-sectional view of one of the third lateral grooves 28 provided on one of the second blocks 27, and which is taken along lines D-D of FIG. 4. As illustrated in FIG. 6B, each third lateral groove 28 provided on the respective second blocks 27, for example, preferably has the wide-width portion 31 having a maximum depth d11 which is smaller than a maximum depth d12 of the narrow-width portion 32. The depth d11 of the wide-width portion 31, for example, is preferably in a range of from 0.65 to 0.75 times the depth d12 of the narrow-width portion 32 in order to improve steering stability on dry road condition and driving performance on ice and snow road conditions in well-balanced manner.

Figure 6C:
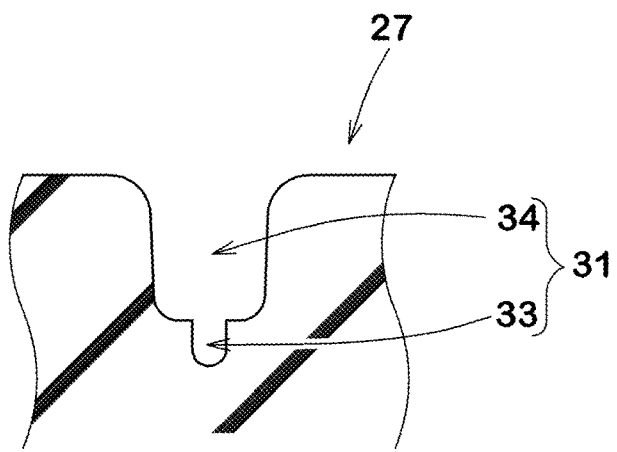

FIG. 6C illustrates a cross-sectional view of the wide-width portion 31 of one of the third lateral grooves 28 provided on one of the second blocks 27, and which is taken along lines E-E of FIG. 4. As illustrated in FIG. 6C, the wide-width portion 31 includes a bottom portion 33 having a width equal to a width of the narrow-width portion and a main portion 34 located radially outwardly of the bottom portion 33 and having a width greater than that of the bottom portion 33. Such a wide-width portion 31 is likely to open the third lateral groove 28 properly upon receiving a ground contact pressure, leading to better driving performance on ice and snow road conditions.

As illustrated in FIG. 4, each of the blocks 25 is preferably provided with a second longitudinal groove 35. The second longitudinal groove 35 extends in the tire circumferential direction in communication with the third lateral groove 28 and the fourth lateral groove 29 on each of the blocks 25. In this embodiment, the second longitudinal groove 35, for example, is arranged on a middle portion of each block 25 in the tire axial direction, and extends along the tire circumferential direction (e.g. parallel with the tire circumferential direction). Further, the second longitudinal groove 35, for example, passes through each of the third lateral groove 28 and the fourth lateral groove 29 to form the respective cross shaped junctions. Alternatively, the second longitudinal groove 35, for example, may pass through each of the third lateral groove 28 and the fourth lateral groove 29 to form the respective T-shaped junctions.

Preferably, both ends of the second longitudinal groove 35, for example, terminate within the block 25. A length L8 of each second longitudinal groove 35 in the tire circumferential direction is preferably in a range of from 0.50 to 0.80 times a length W10 of the block 25 in the tire circumferential direction in order to ensure rigidity of the blocks 25 effectively.

Preferably, a width W11 of each second longitudinal groove 35, for example, is in a range of from 0.5 to 3.0 mm, more preferably 1.5 to 2.0 mm.

Figure 7:
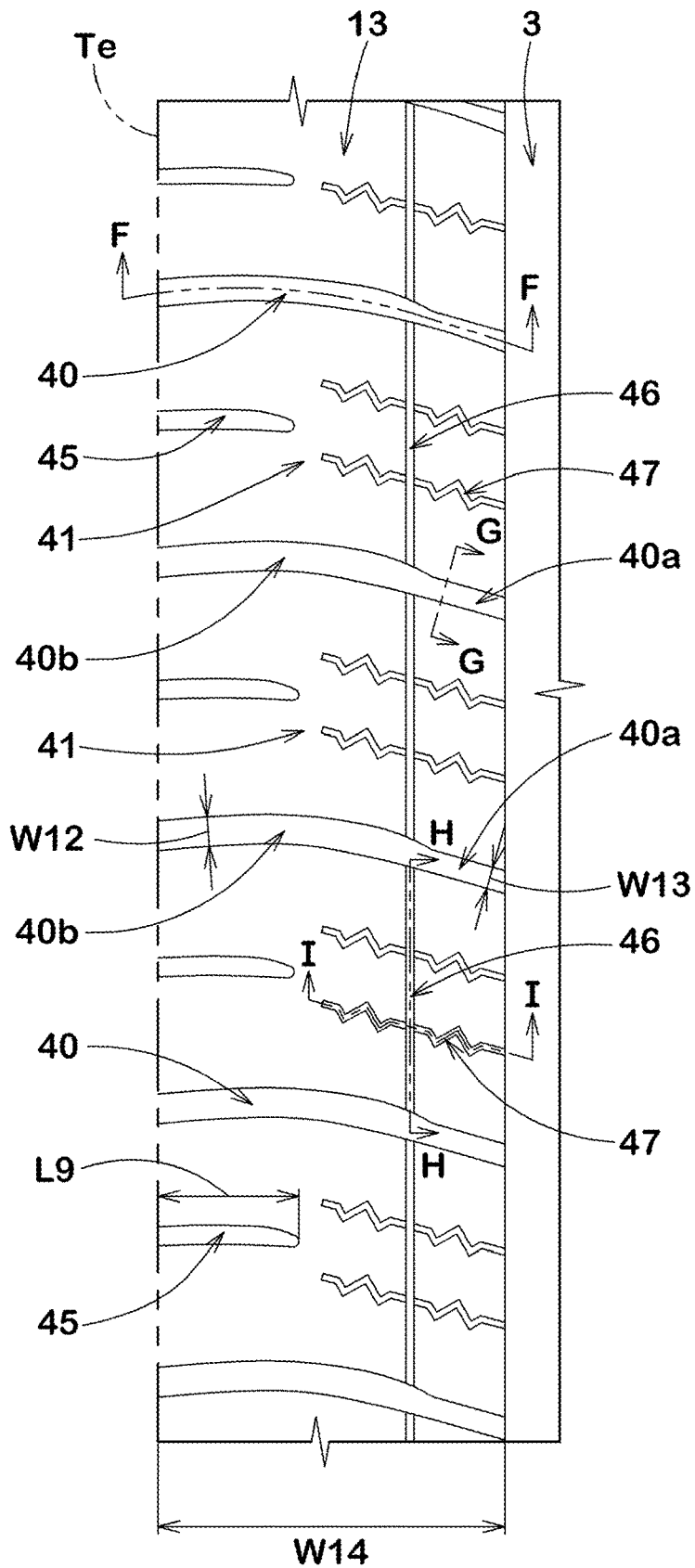
FIG. 7 is a partial enlarged view of a third land portion of FIG. 1.

FIG. 7 illustrates a partial enlarged view of one of the third land portions 13. As illustrated in FIG. 7, the third land portion 13, for example, includes a plurality of third blocks 41 divided by a plurality of third transverse grooves 40 traversing the land portion completely.

The third transverse grooves 40 each include an inner portion 40a in communication with the shoulder main groove 3 and a main portion 40b having a width greater than that of the inner portion 40a in communication with the tread edges Te, for example. Preferably, a width W13 of the inner portion 40a, for example, is in a range of from 0.65 to 0.75 times a width W12 of the main portion 40b. Such third transverse grooves 40 may maintain rigidity of an axially inner portion of the third land portion 13, leading to better driving performance on ice and snow road conditions while improving steering stability on dry road condition.

Figure 8A:
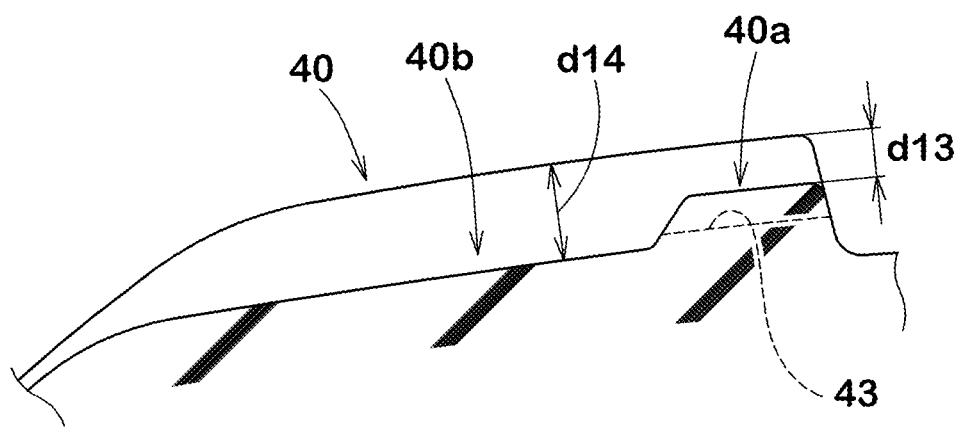
FIG. 8A and FIG. 8B are cross-sectional view taken along lines F-F and G-G of FIG. 7, respectively.

FIG. 8A illustrates a cross-sectional view of one of the third transverse grooves 40 taken along line F-F of FIG. 7. As illustrated in FIG. 8A, each of the third transverse grooves 40 preferably includes a bottom surface that raises upwardly on the inner portion 40a. Preferably, a depth d13 of inner portion 40a, for example, is in a range of from 0.30 to 0.50 times a depth d14 of the main portion 40b.

Figure 8B:
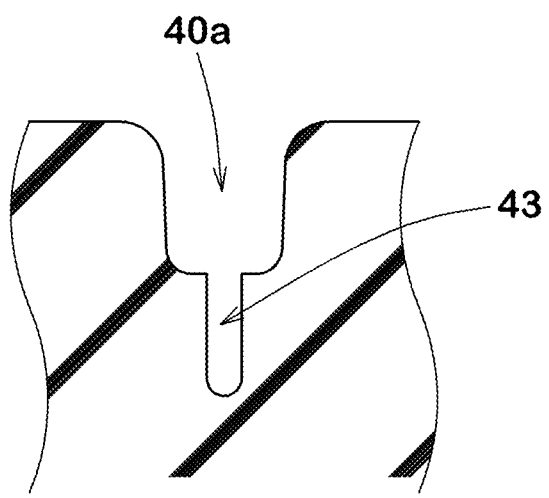

FIG. 8B illustrates a cross-sectional view of the inner portion 40a of one of the third transverse grooves 40 taken along line G-G of FIG. 7. As illustrated in FIG. 8B, the inner portion 40a is preferably provided with a groove bottom sipe 43. The groove bottom sipe 43 has a width of less than 1.5 mm. Thus, the third transverse grooves 40 are likely to open, preventing the third transverse grooves 40 from being clogged with snow.

As illustrated in FIG. 7, each of the third blocks 41, for example, is provided with a fifth lateral grooves 45, a longitudinal sipe 46 and a lateral sipe 47.

The fifth lateral groove 45, for example, extends from the tread edge Te toward the shoulder main groove 3, and terminates within the third land portion 13. Preferably, a length L9 of the fifth lateral groove 45 in the tire axial direction, for example, is in a range of from 0.35 to 0.45 times a width W14 of the third land portion 13 in the tire axial direction in order to improve driving performance on ice and snow road conditions while maintaining rigidity of the third land portion 13.

The longitudinal sipe 46, for example, is located inwardly of the fifth lateral groove 45 in the tire axial direction. In this embodiment, the longitudinal sipe 46, for example, extend along (e.g. parallel with) the tire circumferential direction such that both ends thereof are in communication with adjacent third transverse grooves 40. Such a longitudinal sipe 46, for example, may be helpful in improving steering stability on dry road condition and driving performance on ice and snow road conditions in well-balanced manner, in corporation with the third transverse grooves 40.

Figure 9A:
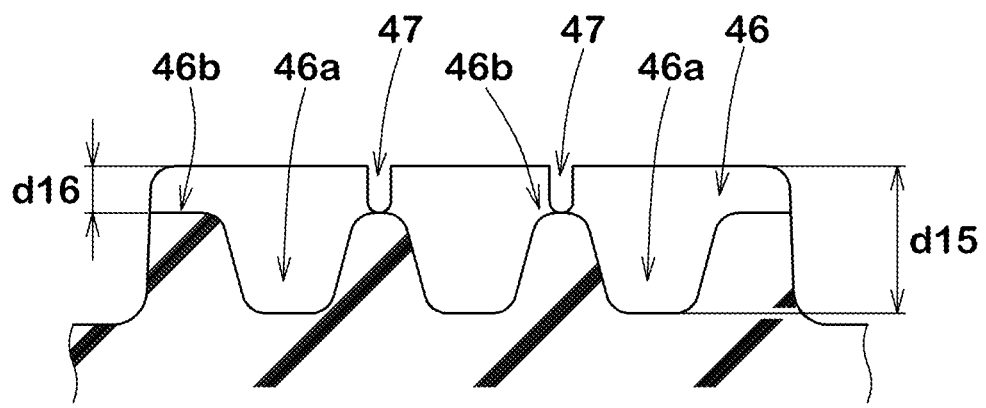
FIG. 9A and FIG. 9B are cross-sectional views taken along lines H-H and I-I of FIG. 7.

FIG. 9A illustrates a cross-sectional view of one longitudinal sipe 46 taken along line H-H of FIG. 7. As illustrated in FIG. 9A, the longitudinal sipe 46 preferably includes at least one deep bottom portion 46a and at least one shallow bottom portion 46b having a depth shallower than that of the deep bottom portion 46a. In this embodiment, the longitudinal sipe 46, for example, includes a plurality of deep bottom portions 46a and a plurality of shallow bottom portions 46b. The shallow bottom portions 46b, for example, preferably have depths d16 in a range of from 0.25 to 0.35 times depths d15 of the deep bottom portions 46a.

In this embodiment, both end portions of the longitudinal sipe 46 are configured as shallow bottom portions 46b. Further, deep bottom portions 46a and shallow bottom portions 46b are arranged alternately in the tire circumferential direction between the end portions. In this embodiment, three deep bottom portions 46a and two shallow bottom portions 46b are provided alternately in the tire circumferential direction between the end portions.

As illustrated in FIG. 7, each of the third blocks 41, for example, is preferably provided with one or two lateral sipes 47. Each lateral sipe 47 extends axially outwardly from the shoulder main groove 3, and terminates within the block 41. Preferably, each lateral sipe 47 has an axially outer end located axially inwardly of an inner end of the fifth lateral groove 45. In this embodiment, each lateral sipe 47 crosses the longitudinal sipe 46.

In this embodiment, each lateral sipe 47, for example, extends in a zigzag manner in the tire axial direction at least partially. In some preferred embodiments, the lateral sipe 47 includes a center portion extending in a straight manner in the tire axial direction and a pair of zigzag portions located both sides the center portion, wherein the central portion is arranged at a location such that the longitudinal sipe 46 passes through the center portion. Such a lateral sipe 47 may help in improving driving performance on ice and snow road conditions while suppressing uneven wear on the junction where the longitudinal sipe 46 and the lateral sipe 47 are connected.

Figure 9B:
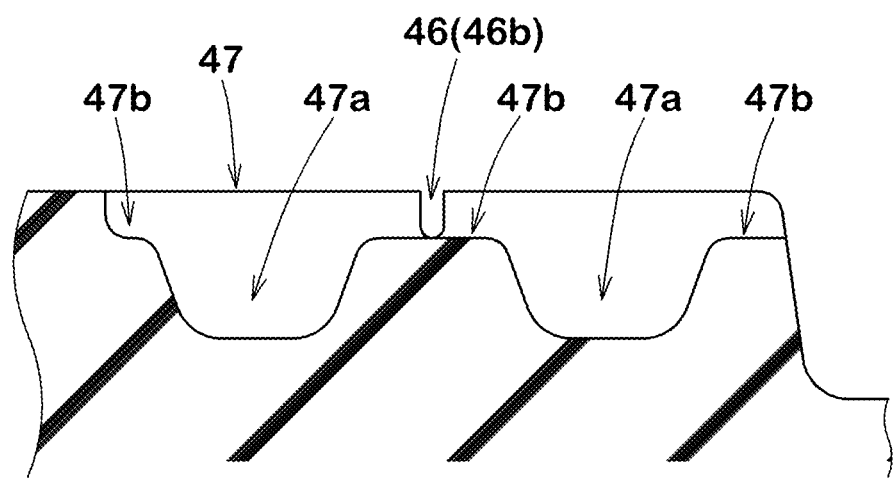

FIG. 9b illustrates a cross-sectional view of one lateral sipe 47 taken along line I-I of FIG. 7. As illustrated in FIG. 9B, the lateral sipe 47, for example, includes deep bottom portions 47a and shallow bottom portions 47b having depths smaller than those of the deep bottom portions 47a. In this embodiment, as to the depths, the deep bottom portions 47a and the shallow bottom portions 47b of the lateral sipe 47 are the same as the deep bottom portions 46a and the shallow bottom portions 46b of the longitudinal sipe 46, respectively.

In some preferred embodiments, the lateral sipe 47, for example, includes both end portions formed as the shallow bottom portions 47b, and one shallow bottom portion 47b and two deep bottom portions 47a provided between the both end portions. In more preferred embodiments, one shallow bottom portion 46b of the longitudinal sipe 46 passes through the shallow bottom portion 47b arranged between the both end portions of the lateral sipe 47b. The lateral sipe 47 as such may offer better driving performance on ice and snow road conditions while maintaining steering stability on dry road condition by suppressing excessive deformation of the third land portion 13.

While the particularly preferable embodiments in accordance with the present invention have been described in detail, the present invention is not limited to the illustrated embodiments, but can be modified and carried out in various aspects.

EXAMPLE

Figure 10:
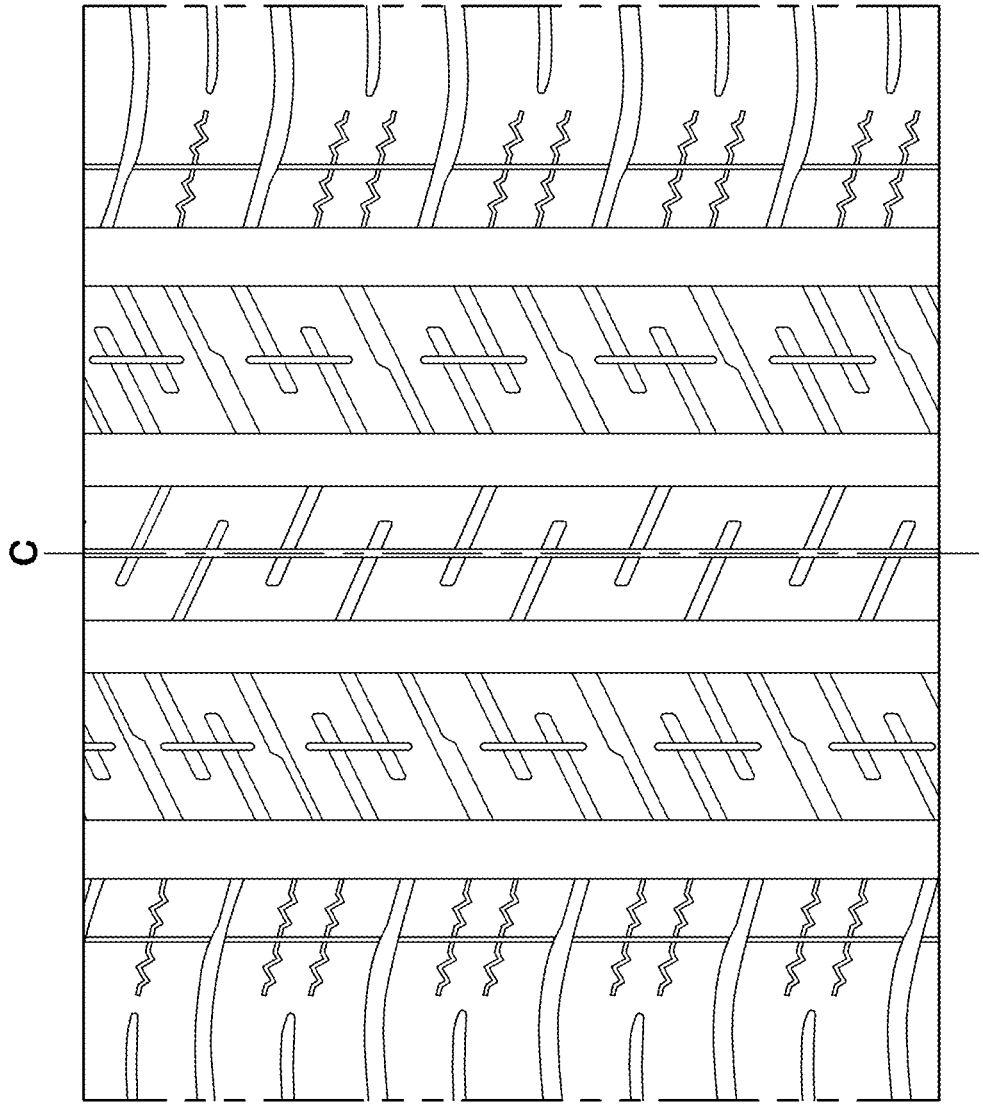
FIG. 10 is a development view of a tread portion of a comparative example tire.

Pneumatic tires 255/50R20 having a basic tread pattern as illustrated in FIG. 1 were manufactured based on the details shown in Table 1. As a comparative example, a tire having a first land portion provided with lateral grooves each having a constant width as shown in FIG. 10 was also manufactured. Then, steering stability on dry road condition, driving performance on ice and snow road conditions and noise performance of test tires were evaluated. The common specification of test tires and test methods are as follows:

Rim size: 20×8.0 J;
Tire inner pressure: 250 kPa;
Test vehicle: four drive wheel vehicle with displacement of 3500 cc; and
Tire location: all wheels.

Test for Steering Stability on Dry Road Condition:

A test driver drove the test vehicle on dry road condition to evaluate the steering stability by his sense. The test results are shown in Table 1 using a score system wherein the Reference tire is set to 100. The larger the value, the better the steering stability is.

Test for Driving Performance on Ice and Snow Road Conditions:

The test driver drove the test vehicle on ice and snow road conditions to evaluate the driving performance by his sense. The test results are shown in Table 1 using a score system wherein the Reference tire is set to 100. The larger the value, the better the driving performance is.

Test for Noise Performance:

Passing noise level upon running at 70 km/h was measured for each test tire based on the test defined by ECE-R117. The test results are shown in Table 1 using an index system wherein the Reference tire is set to 100. The smaller the value, the better the noise performance is.

The test results are shown in Table 1.

TABLE 1

|  | Ref. | Ex. 1 | Ex. 2 | Ex. 3 | Ex. 4 | Ex. 5 | Ex. 6 | Ex. 7 |
|---|---|---|---|---|---|---|---|---|
| Tread pattern | FIG. 10 | FIG. 1 | FIG. 1 | FIG. 1 | FIG. 1 | FIG. 1 | FIG. 1 | FIG. 1 |
| Ratio L3/W4 | 0.76 | 0.76 | 0.65 | 0.85 | 0.76 | 0.76 | 0.76 | 0.76 |
| Ratio L4/L3 | 1 | 0.38 | 0.38 | 0.38 | 0.2 | 0.55 | 0.38 | 0.38 |
| Ratio L5/L4 | — | 1.63 | 1.63 | 1.63 | 4.00 | 0.82 | 1.63 | 1.63 |
| First longitudinal narrow groove width W3 (mm) | 2.0 | 2.0 | 2.0 | 2.0 | 2.0 | 2.0 | 0.5 | 3.0 |
| Steering stability on dry (score) | 100 | 108 | 110 | 105 | 108 | 105 | 109 | 106 |
| Driving performance on ice and snow (score) | 100 | 100 | 95 | 105 | 96 | 101 | 95 | 105 |
| Noise performance (index) | 100 | 94 | 94 | 95 | 93 | 100 | 94 | 97 |

From the test results, it is confirmed that the example tires maintain high steering stability on dry road condition compared with the reference tire. Further, it is confirmed that the example tires exhibit better noise performance.

What is claimed is:

1. A tire comprising:
a tread portion comprising a first land portion having a ground contact surface defined between a circumferentially extending first edge and a circumferentially extending second edge; and
the first land portion being provided with first lateral grooves each extending from the first edge toward the second edge and terminating within the first land portion, second lateral grooves each extending from the second edge toward the first edge and terminating within the first land portion and a circumferentially extending first longitudinal narrow groove in communication with the first lateral grooves and the second lateral grooves, wherein
each of the first lateral grooves and the second lateral grooves comprises a wide-width portion and a narrow-width portion having a width smaller than that of the wide-width portion,
the wide-width portion of each of the first lateral grooves extends from the first edge and the wide-width portion of each of the second lateral grooves extends from the second edge,
the first longitudinal narrow groove passes through the narrow-width portion of each of the first lateral grooves and the second lateral grooves without passing through the wide-width portion of each of the first lateral grooves and the second lateral grooves,
the wide-width portion of each of the first lateral grooves and the second lateral grooves has a localized raised bottom upwardly on an end portion that is connected to a respective main groove, a depth d2 of the raised bottom of the wide-width portion is in a range of from 0.50 to 0.65 times a maximum depth d1 of the wide-width portion, and the narrow-width portion of each of the first lateral grooves and the second lateral grooves has a localized raised bottom upwardly on an end portion connected to the wide-width portion, and a depth d5 of the raised bottom of the narrow-width portion is in a range of from 0.25 to 0.35 times a maximum depth d3 of the narrow-width portion.

2. The tire according to claim 1, wherein the first land portion is located on a tire equator.

3. The tire according to claim 1, wherein the first longitudinal narrow groove passes through the narrow-width portion of each of the first lateral grooves and the second lateral grooves in a cross-shaped manner.

4. The tire according to claim 1, wherein in each of the first lateral grooves and the second lateral grooves, the narrow-width portion is longer in length in a tire axial direction than the wide-width portion.

5. The tire according to claim 1, wherein in each of the first lateral grooves and the second lateral grooves, the narrow-width portion has a maximum depth equal to or less than a maximum depth of the wide-width portion.

6. The tire according to claim 1, wherein in each of the first lateral grooves and the second lateral grooves, the narrow-width portion has a maximum depth less than a maximum depth of the wide-width portion.

7. The tire according to claim 1, wherein in each of the first lateral grooves and the second lateral grooves, the narrow-width portion has a maximum depth greater than a maximum depth of the first longitudinal narrow groove.

8. The tire according to claim 1, the tread portion further comprising a second land portion having a ground contact surface defined between a circumferentially extending third edge and a circumferentially extending fourth edge, the second land portion comprising blocks divided by transverse grooves traversing completely the second land portion, and each of the blocks being provided with a third lateral groove extending from the third edge toward the fourth edge and terminating within the block and a fourth lateral groove extending from the fourth edge toward the third edge and terminating within the block.

9. The tire according to claim 8, wherein the blocks comprise first blocks and second blocks, each of the first blocks being provided with the third lateral groove and the fourth lateral groove each of which extends in a constant width, each of the second blocks being provided with the third lateral groove and the fourth lateral groove each of which comprises a wide-width portion and a narrow-width portion having a width smaller than that of the wide-width portion.

10. The tire according to claim 9, wherein the first blocks and the second blocks are arranged alternately in a tire circumferential direction.

11. The tire according to claim 8, wherein the third lateral groove and the fourth lateral groove are inclined in an opposite direction to the first lateral groove and the second lateral groove with respect to a tire axial direction.

12. The tire according to claim 8, wherein each of the blocks is provided with a circumferentially extending second longitudinal narrow groove in communication with the third lateral groove and the fourth lateral groove.

13. The tire according to claim 12, wherein the second longitudinal narrow groove has both ends terminating within the block.

14. The tire according to claim 13, wherein the second longitudinal groove is arranged on an axial middle location of each block in a tire axial direction.

15. The tire according to claim 13, wherein the second longitudinal groove includes a middle element extending between the third lateral groove and the fourth lateral groove, a first element extending opposite to the fourth lateral groove from the third lateral groove, and a second element extending opposite to the third lateral groove from the fourth lateral groove.

16. The tire according to claim 1, wherein the depth d5 is smaller than the depth d2.

17. The tire according to claim 16, wherein the first longitudinal narrow groove has a maximum depth d4, and the maximum depth d4 is greater than the depth d5.

18. The tire according to claim 1, wherein the first longitudinal narrow groove has a maximum depth d4, and the maximum depth d4 is greater than the depth d5.

19. The tire according to claim 1, wherein the narrow-width portion extends in a straight manner over its entire length.

* * * * *